(12) United States Patent
Wolfe et al.

(10) Patent No.: US 7,219,760 B2
(45) Date of Patent: May 22, 2007

(54) SEAT LOAD SENSING APPARATUS

(75) Inventors: George B. Wolfe, Plymouth, MI (US); Scott J. Pollock, Ypsilanti, MI (US)

(73) Assignee: TRW Automotive U.S LLC, Livonia, MI (US)

( * ) Notice: Subject to any disclaimer, the term of this patent is extended or adjusted under 35 U.S.C. 154(b) by 139 days.

(21) Appl. No.: 11/057,488

(22) Filed: Feb. 14, 2005

(65) Prior Publication Data

US 2006/0180359 A1 Aug. 17, 2006

(51) Int. Cl.
*B60R 21/15* (2006.01)

(52) U.S. Cl. .................. 180/273; 177/144; 280/735

(58) Field of Classification Search ............. 177/144; 180/273; 280/735
See application file for complete search history.

(56) References Cited

U.S. PATENT DOCUMENTS

| | | | |
|---|---|---|---|
| 5,502,284 A | 3/1996 | Meiller et al. | |
| 5,573,269 A | 11/1996 | Gentry et al. | |
| 5,823,278 A * | 10/1998 | Geringer | 177/144 |
| 5,877,677 A | 3/1999 | Fleming et al. | |
| 5,987,370 A | 11/1999 | Murphy et al. | |
| 6,039,344 A | 3/2000 | Mehney et al. | |
| 6,101,436 A | 8/2000 | Fortune et al. | |
| 6,161,891 A * | 12/2000 | Blakesley | 296/65.01 |
| 6,170,866 B1 | 1/2001 | Popp et al. | |
| 6,323,433 B1 | 11/2001 | Mahaney et al. | |
| 6,323,444 B1 | 11/2001 | Aoki | |
| 6,342,683 B1 | 1/2002 | Aoki et al. | |
| 6,401,855 B1 | 6/2002 | Wolfe | |
| 6,476,514 B1 | 11/2002 | Schondorf | |
| 6,508,514 B2 | 1/2003 | Wolfe | |
| 6,559,392 B1 | 5/2003 | Haynes et al. | |
| 6,617,531 B1 | 9/2003 | Aoki | |
| 6,739,206 B2 | 5/2004 | Ishida | |
| 6,774,804 B2 | 8/2004 | Sakai et al. | |
| 7,049,529 B2 * | 5/2006 | Vogel et al. | 177/144 |
| 7,100,731 B2 * | 9/2006 | Suzuki | 180/273 |
| 2002/0053980 A1 | 5/2002 | Masuda et al. | |
| 2002/0063419 A1 | 5/2002 | Susko | |
| 2002/0063630 A1 | 5/2002 | Curtis et al. | |
| 2003/0106723 A1 * | 6/2003 | Thakur et al. | |

(Continued)

*Primary Examiner*—Randy W. Gibson
(74) *Attorney, Agent, or Firm*—Tarolli, Sundheim, Covell & Tummino LLP (57) ABSTRACT

An apparatus (10) is used with a vehicle seat (2) and a vehicle floor pan (4) for supporting the vehicle seat. A sensor lever (100) transmits the load of the vehicle occupant from the vehicle seat (2) to the vehicle floor pan (4). The sensor lever (100) has a first end portion (102), a second end portion (112), and a middle portion (122) interposed between the first end portion and the second end portion. The middle portion (122) of the sensor lever (100) is movable with the vehicle seat (2). The sensor lever (100) has a first sensor portion (107) disposed between the middle portion (122) and the first end portion (102). The sensor lever (100) has a second sensor portion (109) disposed between the middle portion (122) and the second end portion (112). The first and second sensor portions (107, 109) bend as the vehicle seat (2) moves vertically relative to the vehicle floor pan (4). A carrier structure (150) rigidly connects to the sensor lever (100) at the first end portion (102) and the second end portion (112) for connection to the vehicle seat (2). The first and second sensor portions (107,109) provide an output signal indicative of the amount of movement of the middle portion (122).

17 Claims, 6 Drawing Sheets

U.S. PATENT DOCUMENTS

| | | |
|---|---|---|
| 2003/0111276 A1* | 6/2003 | Kajiyama |
| 2003/0177839 A1 | 9/2003 | Tsukada et al. |
| 2004/0035613 A1* | 2/2004 | Wolf et al. |
| 2004/0045759 A1 | 3/2004 | Kiibayashi |
| 2004/0090338 A1 | 5/2004 | Nishino et al. |
| 2004/0124018 A1* | 7/2004 | Yanagi |
| 2004/0135355 A1 | 7/2004 | Selig et al. |
| 2004/0135697 A1 | 7/2004 | Sakai et al. |
| 2004/0159485 A1 | 8/2004 | Sakai et al. |

* cited by examiner

SEAT LOAD SENSING APPARATUS

TECHNICAL FIELD

The present invention relates to an apparatus for sensing a load, and more particularly, to an apparatus for sensing the load imparted to a vehicle seat by a vehicle occupant.

BACKGROUND OF THE INVENTION

A conventional vehicle occupant load sensing apparatus includes a load sensor placed between a vehicle seat frame and a support mount for the seat. The sensor is directly within the vertical load path of the occupant's weight and responds to the vertical loads imparted to the seat by the occupant of the seat. In addition, the sensor may respond to torque loads between the seat and the support mount. Since the seat frame and the support mount must withstand large torque loads (i.e., tilting of the seat frame during crash conditions), typically the sensor also must be constructed to withstand large torque loads.

This construction lessens the sensitivity of the sensor in the vertical load path. Thus, the sensor may not produce a reliable vertical load output signal.

A load sensing apparatus may be constructed to within tight tolerances that would allow the load sensing apparatus to withstand torque loads, but also produce an accurate occupant load output signal related to upward and downward loads in the vertical load path.

SUMMARY OF THE INVENTION

An apparatus in accordance with the present invention is used in a vehicle having a vehicle seat for a vehicle occupant and a vehicle floor pan for supporting the vehicle seat. The apparatus includes a sensor lever and a carrier structure. The sensor lever transmits the load of the vehicle occupant from the vehicle seat to the vehicle floor pan. The sensor lever has a first end portion, a second end portion opposite the first end portion, and a middle portion interposed between the first end portion and the second end portion. The middle portion of the sensor lever is movable with the vehicle seat. The sensor lever has a first sensor portion disposed between the middle portion and the first end portion. The sensor lever has a second sensor portion disposed between the middle portion and the second end portion. The first and second sensor portions bend as the vehicle seat moves vertically relative to the vehicle floor pan. The carrier structure rigidly connects to the sensor lever at the first end portion and the second end portion for connection to the vehicle seat. The first and second sensor portions of the sensor lever provide an output signal indicative of the amount of movement of the middle portion of the sensor lever.

Another apparatus in accordance with the present invention is used in a vehicle having a vehicle seat for a vehicle occupant and a vehicle floor pan for supporting the vehicle seat. The apparatus includes a vehicle seat frame and a sensor. The vehicle seat frame supports a load of the vehicle occupant in the vehicle seat. The vehicle seat frame is movable vertically upon application of a vertical load to the vehicle seat frame. The sensor transmits the load of the vehicle occupant in the vehicle seat from the vehicle seat frame to the vehicle floor pan. The sensor has a first end portion, a second end portion opposite the first end portion, and a middle portion interposed between the first end portion and the second end portion. The middle portion of the sensor is movable with the vehicle seat frame. The sensor bends as the vehicle seat frame moves vertically relative to the vehicle floor pan. The sensor detects movement of the middle portion of the sensor and provides an output signal indicative of the amount of movement of the middle portion of the sensor.

Still another apparatus in accordance with the present invention is used in a vehicle having a vehicle seat for a vehicle occupant and a vehicle floor pan for supporting the vehicle seat. The apparatus includes a sensor lever for transmitting the load of the vehicle occupant from the vehicle seat to the vehicle floor pan. The sensor lever has a first end portion, a second end portion opposite the first end portion, and a middle portion interposed between the first end portion and the second end portion. The middle portion of the sensor lever is movable with the vehicle seat. The sensor lever has a first sensor portion between the middle portion and the first end portion. The sensor lever has a second sensor portion between the middle portion and the second end portion. The first and second sensor portions bend as the vehicle seat moves vertically relative to the vehicle floor pan. The apparatus further includes a means for rigidly connecting the first end portion to the second end portion. The first and second sensor portions of the sensor lever provide an output signal indicative of the amount of movement of the middle portion of said sensor.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF AN EXAMPLE EMBODIMENT

According to an example embodiment of the present invention, as shown in FIGS. 1–5, a vehicle occupant load sensing apparatus 10 is used in a vehicle having a seat 2 for the vehicle occupant. A vehicle floor pan 4 supports the vehicle seat 2.

The apparatus 10 includes a vehicle seat frame 20 for supporting the vehicle seat 2, a bracket 30 for supporting the vehicle seat frame 20, an upper track 12 for supporting the bracket, a lower track 16 for adjustably supporting the upper track, a generally rectangular sensor lever 100, and a generally rectangular carrier member 120.

Figure 2:
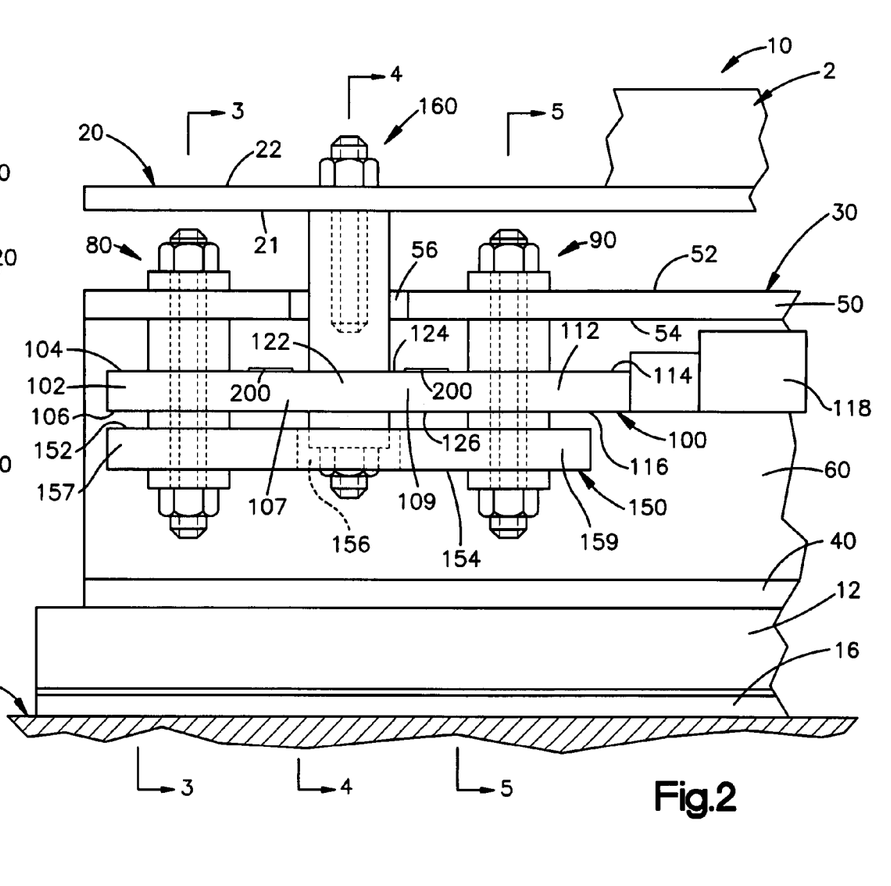
FIG. 2 is a schematic representation of the apparatus of FIG. 1 taken along line 2—2 of FIG. 1.

A first fastener assembly 80 interconnects the bracket 30, the vehicle seat frame 20, the sensor leaver 100, and the carrier member 150. A second fastener assembly 90 interconnects the bracket 30, the vehicle seat frame 20, the sensor leaver 100, and the carrier member 150. A third fastener assembly 160 interconnects the sensor lever 100 and the vehicle seat frame 20.

The first fastener assembly 80 includes a fastener 82 with a longitudinal axis 81, upper and lower fastener members 84 rotatable about the longitudinal axis of the fastener, and a spacer 86 interposed between the sensor lever 100 and the carrier member 150. The second fastener assembly 90 includes a fastener 92 with a longitudinal axis 91, upper and lower fastener members 94 rotatable about the longitudinal axis of the fastener, and a spacer 96 interposed between the sensor lever 100 and the carrier member 150. The third fastener assembly 160 includes a upper and lower fasteners 162 each with a longitudinal axis 161, upper and lower fastener members 164 each rotatable about the longitudinal axis of the fasteners, and a spacer 166 interposed between the sensor lever 100 and the lower fastener member.

The vehicle seat frame 20 supports a weight load of the vehicle occupant in the vehicle seat 2. During a vehicle collision, the seat frame 20 may also sustain upward and lateral loads created by the vehicle collision. The load of the vehicle occupant in the vehicle seat 2 is transmitted through the sensor lever 100, the first and second fastener assemblies 80, 90, the bracket 30, the upper track 12, and the lower track 16 from the vehicle seat frame 20 to the vehicle floor pan 4.

Figure 3:
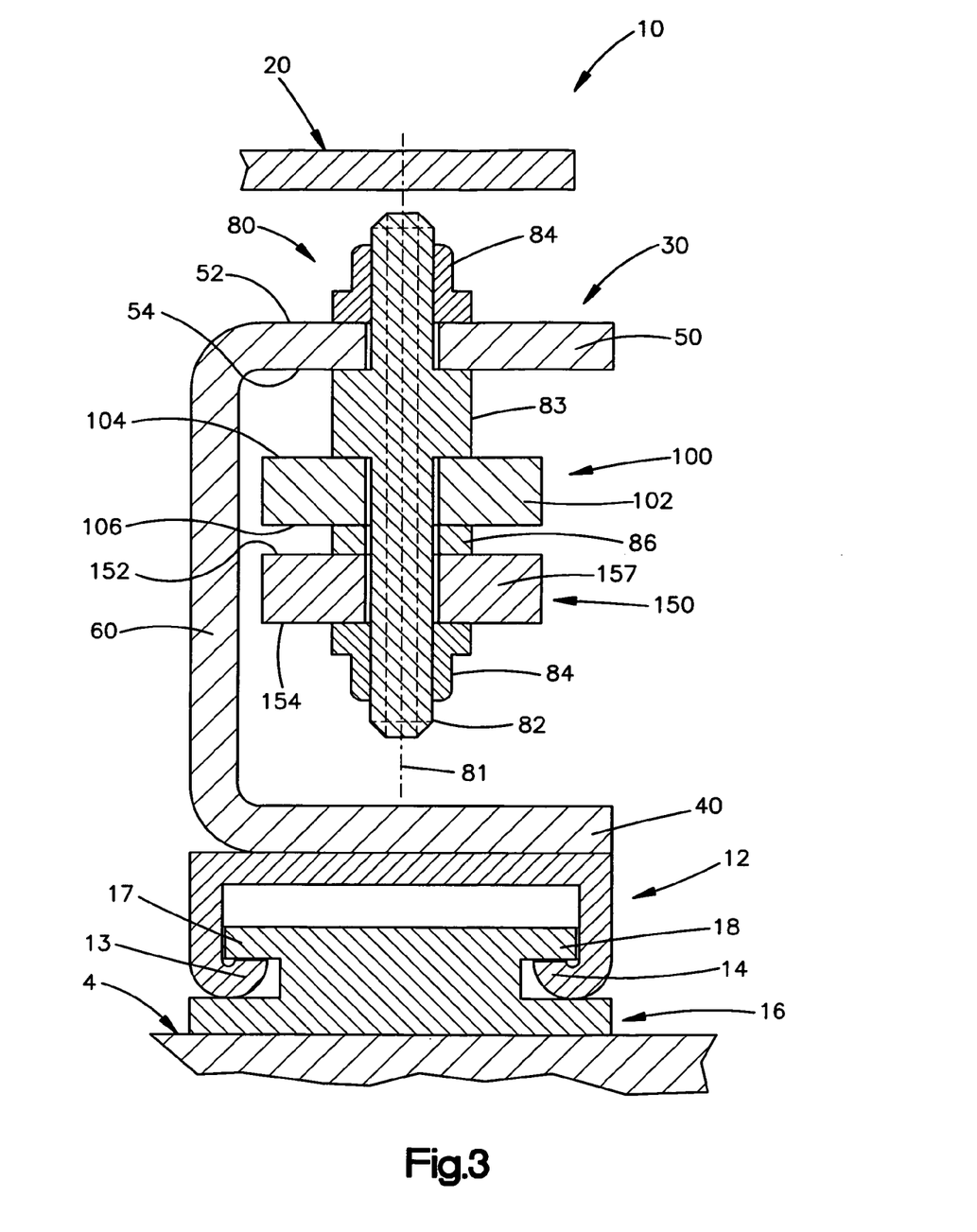
FIG. 3 is a schematic representation of the apparatus of FIG. 2 taken along line 3—3 of FIG. 2.
Figure 4:
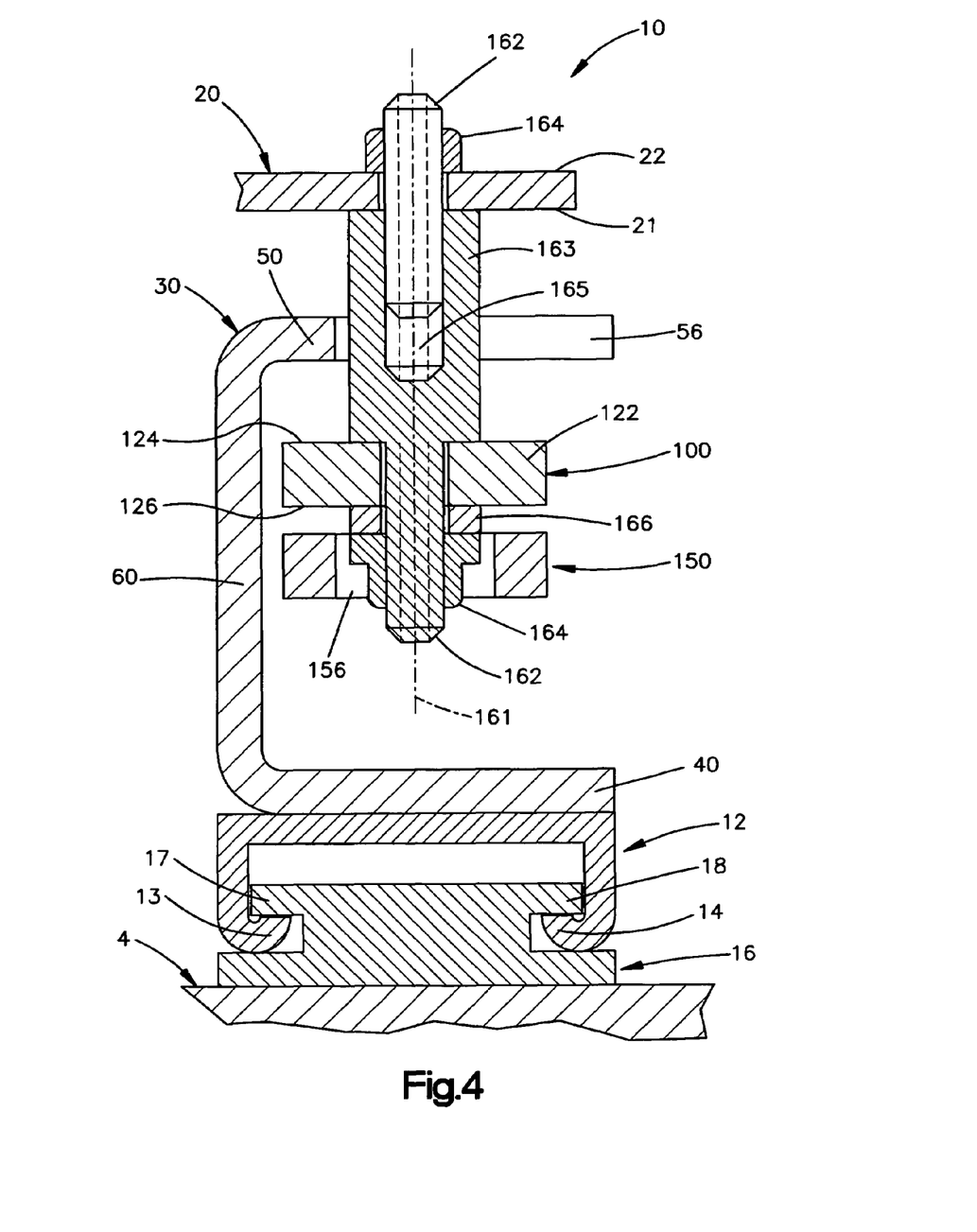
FIG. 4 is a schematic representation of the apparatus of FIG. 2 taken along line 4—4 of FIG. 2.
Figure 5:
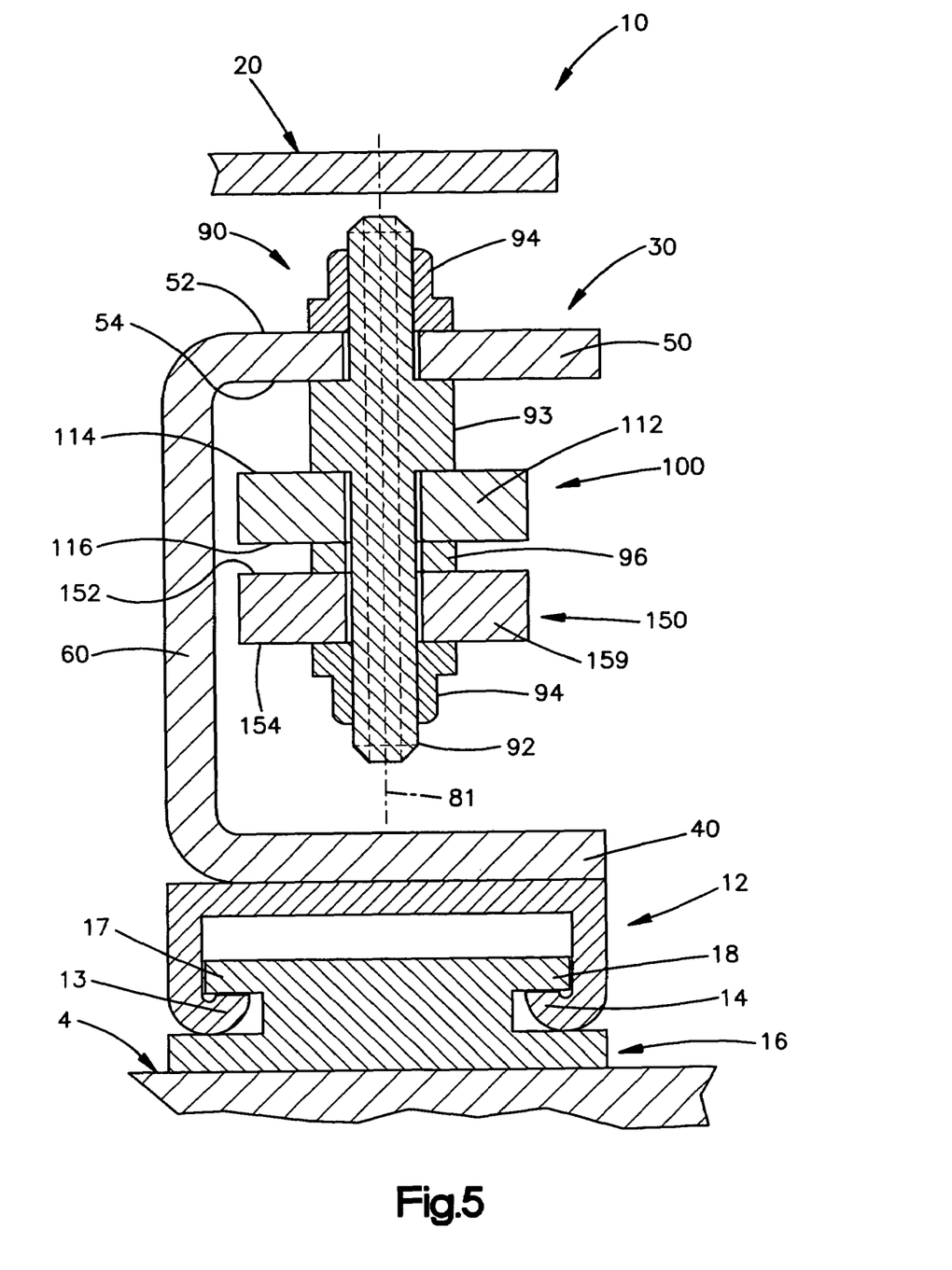
FIG. 5 is a schematic representation of the apparatus of FIG. 2 taken along line 5—5 of FIG. 2.

The lower track 16 is fixedly attached to the vehicle floor pan 4 in a suitable manner. The lower track 16 has two opposite side rails 17, 18 (FIGS. 3–5). The upper track 12 has two opposite rails 13, 14 that slidingly engage the side rails 17, 18 of the lower track 16. The upper track 12 may slide on the lower track 16 for manual forward or rearward adjustment of the position of the seat 2 for occupants of varying sizes, as is known in the art.

The bracket 30 is fixedly attached to the upper track 12 in a suitable manner (FIGS. 3–5). The bracket 30 thus is supported by the upper track 12 so that it is vertically stationary and does not move vertically as a result of loads applied to the vehicle seat 2.

The bracket 30 is typically constructed of a suitable metal such as steel. The bracket 30 has a first horizontal portion 40 for fixed connection to the upper track 12 and a second horizontal portion 50 for fixed connection to the sensor lever 100. The first portion 40 of the bracket 30 is connected to the second portion 50 of the bracket 30 by a third vertical portion 60 thereby forming a C-shaped cross-section (FIGS. 3–5).

The flexibility of the sensor lever 100 allows the sensor lever 100 to deflect in an amount proportional to a vertical load applied to the vehicle seat frame 20 by a vehicle occupant. The second portion 50 of the bracket 30 has an upper horizontal surface 52 and a lower horizontal surface 54 opposite the upper surface. The second portion 50 also has a notched opening 56 for allowing vertical movement of the third fastener assembly 160 when a load is placed on the vehicle seat frame 20 (FIG. 2).

Figure 1:
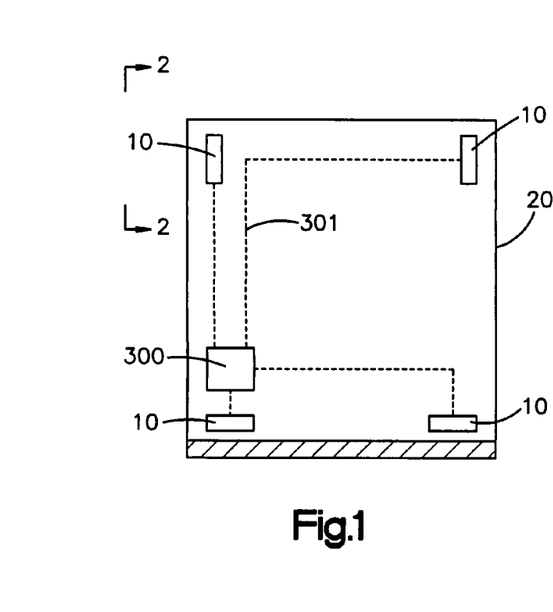
FIG. 1 is a schematic representation of an example apparatus in accordance with the present invention.

The sensor lever 100 has a first end portion 102 with an upper horizontal surface 104 and lower horizontal surface 106 opposite the upper horizontal surface. The sensor lever 100 has a second end portion 112 with an upper horizontal surface 114 and lower horizontal surface 116 opposite the upper horizontal surface. The second end portion 112 also has an electronic connector 118 for transmitting signals from the sensor lever 100 to an electronic controller 300 (FIG. 1). A middle portion 122 of the sensor lever 100 is interposed between the first end portion 102 and the second end portion 112. The middle portion 122 has an upper horizontal surface 124 and a lower horizontal surface 126 opposite the upper horizontal surface.

Sensors 200 are disposed on the upper surface 124 of sensor portions 107, 109 of the middle portion 122 of the sensor lever 100 adjacent both sides of the third fastener assembly 160 (FIG. 2). Sensors 200 may also be disposed on the lower surface 126 of the sensor portions 107, 109 adjacent both sides of the third fastener assembly 160. The sensors 200 are strain gauge type sensors or other suitable sensors for detecting the amount of bending of the middle portion 122 of the sensor lever 100.

The carrier member 150 is a means for rigidly connecting, or stiffening the connection between, the first end portion 102 of the sensor lever 100 and the second end portion 112 of the sensor lever 100. This stiffening facilitates the bending of only the middle portion 122 of the lever 100 when a vertical load is placed in the vehicle seat 2.

The carrier member 150 is a rectangular plate with an upper horizontal surface 152 and a lower horizontal surface 154 opposite the upper horizontal surface. The carrier member 150 has a circular opening 156 extending from the upper surface 152 to the lower surface 154. The carrier member 150 thereby increases the load-bearing capability of the sensor lever 100 without desensitizing the sensors 200 to small load variations.

The fastener 82, a bolt with an integral shoulder portion 83, extends upward from the lower fastener member 84, such as a nut, through a first end portion 157 of the carrier member 150, the spacer 86, the first end portion 102 of the sensor lever 100, and the second portion 50 of the bracket 30 to the upper fastener member 84, such as a nut.

The lower fastener member 84 engages the lower surface 154 of the carrier member 150. The spacer 86 engages the upper surface 152 of the carrier member 150 and the lower surface 106 of the first end portion 102 of the sensor lever 100. The integral shoulder portion 83 of the fastener 82 engages the upper surface 104 of the first end portion 102 of the sensor lever 100 and the lower surface 54 of the second portion 50 of the bracket 30. The upper fastener member 84 engages an upper surface 52 of the second portion 50 of the bracket 30. The first end portion 102 of the sensor lever 100 is thus fixedly associated with the mounting bracket 30 by the first fastener assembly 80.

The fastener 92, a bolt with an integral shoulder portion 93, extends upward from the lower fastener member 94, such as a nut, through a second end portion 159 of the carrier member 150, the spacer 96, the second end portion 112 of the sensor lever 100, and the second portion 50 of the bracket 30 to the upper fastener member 94, such as a nut.

The lower fastener member 94 engages the lower surface 154 of the carrier member 150. The spacer 96 engages the upper surface 152 of the carrier member 150 and the lower surface 116 of the second end portion 112 of the sensor lever 100. The integral shoulder portion 93 of the fastener 92 engages the upper surface 114 of the second end portion 112 of the sensor lever 100 and the lower surface 54 of the second portion 50 of the bracket 30. The upper fastener member 94 engages the upper surface 52 of the second portion 50 of the bracket 30. The second end portion 112 of the sensor lever 100 is thus fixedly associated with the of the mounting bracket 30 by the second fastener assembly 90.

The lower fastener 162, a bolt with an integral shoulder portion 163 having a female threaded opening 165, extends upward from the lower fastener member 164, such as a nut, the spacer 166, and the middle portion 122 of the sensor lever 100 to the vehicle seat frame 20. The upper fastener 162 is threaded into the opening 165 and extends upward through the vehicle seat frame 20 to the second fastener member 164.

The lower fastener member 164 engages the spacer 166. The spacer 166 engages the lower fastener member 164 and the lower surface 126 of the middle portion 122 of the sensor lever 100. The integral shoulder portion 163 of the lower fastener 162 engages the upper surface 124 of the middle portion 122 of the lever 100 and a lower surface 21 of the vehicle seat frame 20. The upper fastener member 164 engages an upper surface 22 of the vehicle seat frame 20. The middle portion 122 of the sensor lever 100 is thus fixedly associated with, and movable with, the vehicle seat frame 20 by the third fastener assembly 160.

The sensor lever 100, typically an elastic metal such as stainless steel or aluminum, bends as the seat frame 20 moves vertically relative to the bracket 30. The middle portion 122 of the sensor lever 100 may be over-molded with a polymer for environmentally sealing the sensors 200 mounted thereon. The sensors 200 are typically strain gauge sensors that are applied to the upper and/or lower surfaces 124, 126 of the middle portion 122 of the sensor lever 100, preferably by a silk-screening process.

Figure 6:
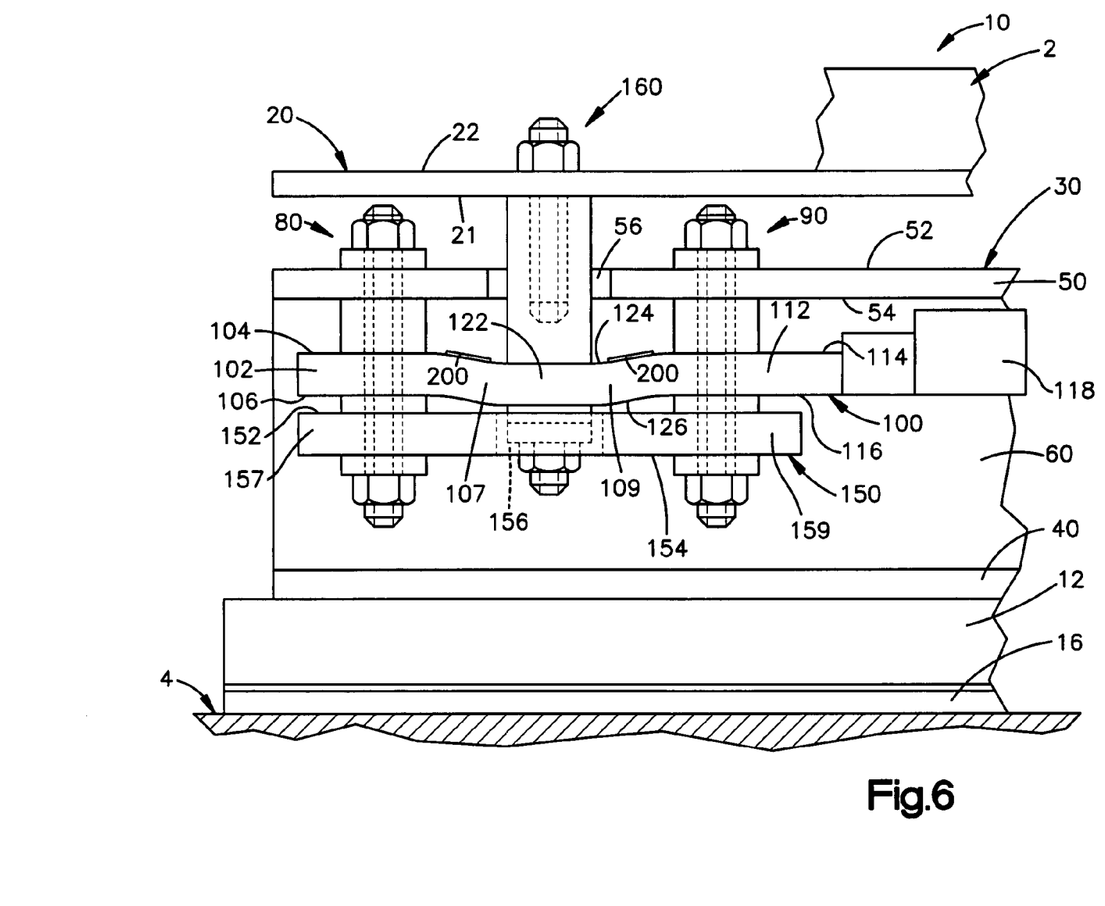
FIG. 6 is a schematic representation of the apparatus of FIG. 2 under a different condition.

When a downward load is placed on the seat frame 20, the sensor portions 107, 109 of the middle portion 122 of the sensor lever 100 deflect downward (FIG. 6), since the first and second end portions 102, 112 of the sensor lever 100 are fixed vertically. The amount of deflection of the sensor portions 107, 109 is sensed by the sensors 200. A signal indicative of the amount of bending is transmitted, through the connector 118, to the electronic controller 300. An apparatus, similar to the apparatus 10, may be placed at each corner of the vehicle seat 2 (FIG. 1) in any suitable orientation (i.e., 90 degrees offset from FIG. 2). The electronic controller 300, combining four signals in a suitable manner, may thus determine the load placed on each apparatus 10 and the seat 2 as a whole.

Figure 7:
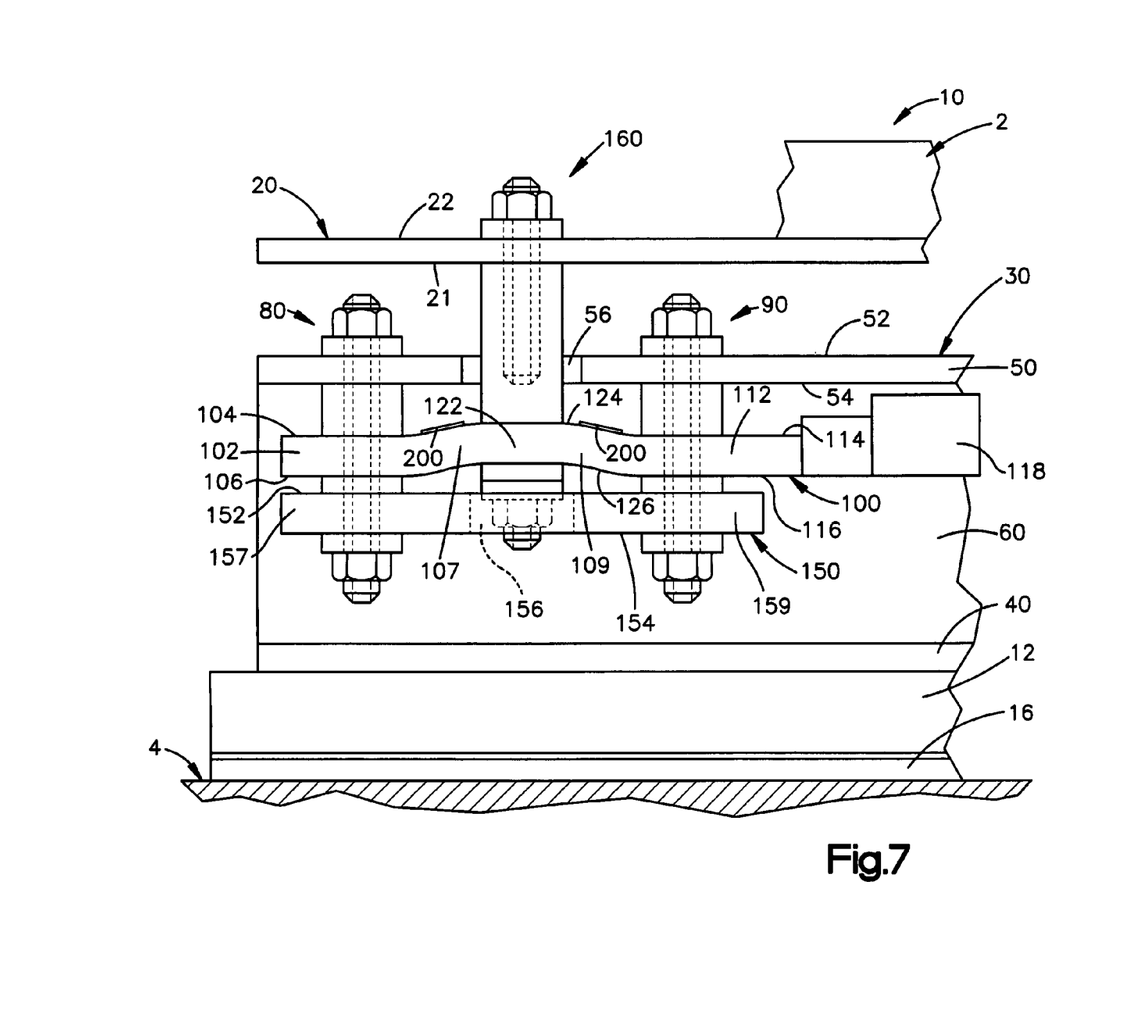
FIG. 7 is a schematic representation of the apparatus of FIG. 2 under another different condition.

When an upward load is placed on the seat frame 20, the sensor portions 107, 109 of the middle portion 122 of the sensor lever 100 deflect upward (FIG. 7) since the first and second end portions 102, 112 of the sensor lever 100 are fixed vertically. The amount of deflection of the sensor portions 1–7, 109 is sensed by the sensors 200. A signal indicative of the amount of bending is transmitted, through the connector 118, to the electronic controller 300. As stated above, an apparatus, similar to the apparatus 10, may be placed at each corner of the vehicle seat 2. The electronic controller 300, combining four signals in a suitable manner, may thus determine the upward load placed on each apparatus 10 and the seat 2 as a whole.

The sensors 200 produce an output signal directly proportional to the vertical force applied to the seat frame 20 via the vehicle seat 2 (i.e., the weight of the vehicle occupant, a load incurred during a vehicle collision, etc.). The sensors 200, while preferably strain gauge sensors, may be any suitable sensors.

As stated above, the apparatus 10 may be placed at each corner of the rectangular seat frame 20 and may be used in conjunction with other similar apparatuses to generate multiple signals (such as two at the front corners of a seat frame and two at rear corners of a seat frame). A wire harness 301 may transmit the output signals from the apparatuses to the electrical controller 300.

The sensor 200 may be electrically connected to the electronic controller 300 by lead wires running to the connector 118 mounted on the second end portion 112 of the sensor lever 100. The electronic controller 300 processes the signals from the apparatuses at each corner of the seat and generates an output signal indicative of the load on the seat frame 20. The multiple signals also can be analyzed by the electronic controller 300 to produce output signals for controlling occupant protection devices, such as an air bags, seat belt pretensioners, etc.

A seat belt assembly (not shown) may also be associated with the vehicle seat. The seat belt assembly may include a seat belt retractor, mounted for example to the vehicle floor pan, and a seat belt buckle connected to the bracket. The seat belt would extend from the retractor to the buckle across a vehicle occupant in the seat.

From the above description of the invention, those skilled in the art will perceive improvements, changes and modifications. For example, the apparatus 10 may be placed below the upper and lower tracks with the bracket attaching directly to the vehicle floor pan. Such improvements, changes and modifications are intended to be included within the scope of the appended claims.

Having described the invention, the following is claimed:

1. An apparatus for use in a vehicle having a vehicle seat for a vehicle occupant and a vehicle floor pan for supporting the vehicle seat, said apparatus comprising:

a sensor lever for transmitting the load of the vehicle occupant from the vehicle seat to the vehicle floor pan, said sensor lever having a first end portion, a second end portion opposite said first end portion, and a middle portion interposed between said first end portion and said second end portion, said middle portion of said sensor lever being fixedly associated with the vehicle seat, said sensor lever having a first sensor portion between said middle portion and said first end portion, said sensor lever having a second sensor portion between said middle portion and said second end portion, said first and second sensor portions bending as the vehicle seat moves vertically relative to the vehicle floor pan; and a carrier structure rigidly connected to said sensor lever at said first end portion and said second end portion for connection to the vehicle seat, said first and second sensor portions of said sensor lever providing an output signal indicative of the amount of movement of said middle portion of said sensor lever.

2. The apparatus as defined in claim 1 further including a sensor located on said first sensor portion.

3. The apparatus as defined in claim 1 further including an upper track fixedly connected to said first end portion and said second end portion, said upper track engaging a lower track and movable on said lower track for adjusting said seat for occupants of varying sizes.

4. The apparatus as defined in claim 1 further including a fastener assembly for securing said sensor lever and said carrier structure together.

5. The apparatus as defined in claim 1 further including a bracket for transferring the load of the vehicle occupant from the vehicle seat to the vehicle floor pan.

6. The apparatus as define in claim 1 further including a bracket with a first portion for engaging said sensor lever and a second portion for engaging an upper track.

7. The apparatus as defined in claim 1 further including a bracket for engaging said first end portion and said second end portion of said sensor lever.

8. An apparatus for use in a vehicle having a vehicle seat for a vehicle occupant and a vehicle floor pan for supporting the vehicle seat, said apparatus comprising:

a vehicle seat frame for supporting a load of the vehicle occupant in the vehicle seat, said vehicle seat frame being movable vertically upon application of a vertical load to said vehicle seat frame;

a sensor for transmitting the load of the vehicle occupant in the vehicle seat from said vehicle seat frame to the vehicle floor pan, said sensor having a first end portion, a second end portion opposite said first end portion, and a middle portion interposed between said first end portion and said second end portion, said middle portion of said sensor being fixed vertically with said vehicle seat frame, said sensor bending as said vehicle seat frame moves vertically relative to the vehicle floor pan, said sensor detecting movement of said middle portion of said sensor and providing an output signal indicative of the amount of movement of said middle portion of said sensor.

9. The apparatus as defined in claim 8 further including a bracket for transferring the load of the vehicle occupant from the vehicle seat frame, through said sensor, to the vehicle floor pan.

10. The apparatus as defined in claim 8 further including a fastener assembly for connecting said middle portion of said sensor to said vehicle seat frame.

11. The apparatus as defined in claim 8 further including a carrier structure for stiffening said sensor.

12. The apparatus as defined in claim 11 wherein said carrier structure has a circular opening for allowing deflection of said sensor.

13. An apparatus for use in a vehicle having a vehicle seat for a vehicle occupant and a vehicle floor pan for supporting the vehicle seat, said apparatus comprising:

a sensor lever for transmitting the load of the vehicle occupant from the vehicle seat to the vehicle floor pan, said sensor lever having a first end portion, a second end portion opposite said first end portion, and a middle portion interposed between said first end portion and said second end portion, said middle portion of said sensor lever being fixedly attached to the vehicle seat, said sensor lever having a first sensor portion between said middle portion and said first end portion, said sensor lever having a second sensor portion between said middle portion and said second end portion, said first and second sensor portions bending as the vehicle seat moves vertically relative to the vehicle floor pan; and a means for rigidly connecting said first end portion to said second end portion, said first and second sensor portions of said sensor lever providing an output signal indicative of the amount of movement of said middle portion of said sensor.

14. The apparatus as defined in claim 13 further including a bracket for connecting said first end portion and said second end portion of said sensor lever to the vehicle floor pan.

15. The apparatus as defined in claim 14 further including a fastener assembly for connecting the vehicle seat to said middle portion of said sensor lever.

16. The apparatus as defined in claim 15 wherein said connecting means includes a carrier structure having a first end portion fixedly connected to said first end portion of said sensor lever and a second end portion fixedly connected to said second end portion of said sensor lever.

17. The apparatus as defined in claim 16 wherein said first end portion of said sensor lever and said first end portion of said carrier structure are both fixedly attached to a bracket.

* * * * *